US009648095B2

(12) United States Patent
Tyagi et al.

(10) Patent No.: US 9,648,095 B2
(45) Date of Patent: May 9, 2017

(54) SYSTEM AND METHOD FOR PROCESSING DATA FEEDS

(71) Applicant: M/s MobileMotion Technologies Private Limited, Bengaluru (IN)

(72) Inventors: Shivansh Tyagi, Bengaluru (IN); Ravi Pratap Maddimsetty, Bengaluru (IN)

(73) Assignee: MOBILEMOTION TECHNOLOGIES PRIVATE LIMITED, Karnataka (IN)

( * ) Notice: Subject to any disclaimer, the term of this patent is extended or adjusted under 35 U.S.C. 154(b) by 584 days.

(21) Appl. No.: 14/013,807

(22) Filed: Aug. 29, 2013

(65) Prior Publication Data

US 2014/0068083 A1    Mar. 6, 2014

Related U.S. Application Data

(60) Provisional application No. 61/694,295, filed on Aug. 29, 2012.

(51) Int. Cl.
*G06F 15/173*    (2006.01)
*H04L 29/08*    (2006.01)
*G06F 9/46*    (2006.01)

(52) U.S. Cl.
CPC ............ *H04L 67/1002* (2013.01); *G06F 9/46* (2013.01)

(58) Field of Classification Search
CPC ... G06F 9/46; G06F 11/14; G06F 3/12; G06F 15/173; H04L 67/1002; H04L 29/08
See application file for complete search history.

(56) References Cited

U.S. PATENT DOCUMENTS

| 8,775,161 B1* | 7/2014 | Nichols | G06F 17/30699 704/1 |
|---|---|---|---|
| 2004/0205698 A1* | 10/2004 | Schliesmann | H04N 5/44513 717/106 |
| 2007/0143454 A1* | 6/2007 | Ma | H04L 67/1008 709/222 |
| 2008/0189391 A1* | 8/2008 | Koberstein | H04L 67/26 709/218 |
| 2008/0256213 A1* | 10/2008 | Carrier | G06Q 30/02 709/207 |
| 2012/0197686 A1* | 8/2012 | Abu El Ata | G06Q 10/06393 705/7.39 |
| 2013/0224697 A1* | 8/2013 | McCallum | G06Q 30/0251 434/178 |

FOREIGN PATENT DOCUMENTS

GB    1202674 A * 8/1970 .............. G06F 9/34

* cited by examiner

*Primary Examiner* — Arvin Eskandarnia
(74) *Attorney, Agent, or Firm* — Symbus Law Group, LLC; Clifford D. Hyra

(57) ABSTRACT

The present invention provides a method and a system for processing a plurality of data feeds. The method and system include acquiring the plurality of data feeds from one or more content servers via a network, adding a respective task of a plurality of tasks to each of the plurality of data feeds, queuing the plurality of tasks at a queuing database, fetching each of the plurality of tasks queued at the queuing database by one or more worker servers and asynchronously processing the plurality of tasks by the one or more worker servers. Each respective task of the plurality of tasks is a request for processing a data feed of the plurality of data feeds.

11 Claims, 5 Drawing Sheets

SYSTEM AND METHOD FOR PROCESSING DATA FEEDS

CROSS-REFERENCE TO RELATED APPLICATIONS

This application claimed priority to Provisional Application Ser. No. 61/694,295 filed Aug. 29, 2012, the contents of which are hereby incorporated by reference.

FIELD OF INVENTION

The present invention generally relates to data feeds and in general relates to a method and a system for large scale processing of data feeds.

BACKGROUND OF TI-HE INVENTION

With the advent of the Internet, information is easily disseminated to a user via websites. The content on most websites such as, news sites, product information pages, medical websites, sports websites, weblogs, podcasts, video sites, etc., often change on an unpredictable schedule. Therefore, a user who wishes to check for updates has to repeatedly check each website for the updates. Moreover, with the innumerable number of websites available on the Internet today, manually checking each website for updates proves to be very tedious. This problem has spurred the adoption of data feeds that collate the content from various websites into a common, convenient web syndication format such as Really Simple Syndication (RSS) or Atom. Each of the web syndication formats follows a general structure which includes multiple items. Examples of multiple items include but may not be limited to a link, a title, and a meta-data such as HyperText Markup Language (HTML).

The data feeds associated with a website enable people to keep up with their websites in an automated manner rather than manually checking and pulling content from individual websites. However, processing of the data feeds is computation intensive and requires HTML parsing and custom data transformations in accordance to an application. Moreover, processing of the data feeds becomes very challenging in the presence of tens of thousands of data feeds and records in the data feeds.

Conventional solutions for processing data feeds include scheduling the various data feeds through a scheduler. The scheduler may be a system-wide scheduler or a language based scheduler. Examples of the system-wide scheduler include but not may be limited to a cron and hcron. The term 'cron' refers to a time-based job scheduler that enables users to schedule jobs to run periodically at certain times or dates. Examples for the language based scheduler include but not limited to a Java® based scheduler, Python® based scheduler and Ruby® based scheduler. Examples of the Java® based scheduler include but may not be limited to Quartz®, Essiembre, and Fulcrum®. The Python® based scheduler may be an Advanced Python® scheduler. Examples of the Ruby® based scheduler includes but may not be limited to Rufus, and Delayed Job.

In other conventional approach, a method that uses large scale feed processing using large server farms using a Pacman framework or a Pepper framework which runs on Java® based Hadoop® is disclosed. Hadoop® refers to a software framework that allows for the distributed processing of large data sets across clusters of computers.

However, most of the conventional approach describes synchronous methods of processing the data feeds. In these synchronous methods of data feeds, the data feeds are processed sequentially and does not enable simultaneous processing of the data feeds. The conventional approach cannot keep up with the processing when the burst rate of the data feeds is very high. For example, when the burst rate of the data feeds is greater than thousand requests per minute, it becomes extremely difficult to keep up with the processing of the data feeds without leading to inconsistency of data, losing some data feed requests, crashing of servers and the like.

In light of the above stated discussion, there is need for a method and a system which will overcome the above stated problems. In addition, the method and system should use asynchronous methods of processing the data feeds, thereby enabling processing of a large number of data feeds.

BRIEF DESCRIPTION OF THE INVENTION

The above-mentioned shortcomings, disadvantages and problems are addressed herein which will be understood by reading and understanding the following specification.

The present invention provides a method for processing a plurality of data feeds. The method includes acquiring the plurality of data feeds from one or more content servers via a network, adding a respective task of a plurality of tasks to each of the plurality of data feeds, queuing the plurality of tasks at a queuing database, fetching each of the plurality of tasks queued at the queuing database by one or more worker servers and asynchronously processing the plurality of tasks by the one or more worker servers. Each respective task of the plurality of tasks is a request for processing a data feed of the plurality of data feeds.

In an embodiment of the present invention, a push mechanism enables acquiring the plurality of data feeds from the one or more content servers. In another embodiment of the present invention, a pull mechanism enables acquiring the plurality of data feeds from the one or more content servers.

In an embodiment of the present invention, the method includes storing the plurality of tasks in a persistent queue. The queuing of the plurality of tasks is based on a priority. The priority is based on a predetermined criterion.

In an embodiment of the present invention, asynchronously processing of plurality of tasks by a worker server of the one or more worker servers includes requesting for additional tasks irrespective of status of the plurality of tasks running on other worker servers of the one or more worker servers.

In another aspect of the present invention, a method for processing a plurality of data feeds is provided. The method includes acquiring the plurality of data feeds from one or more content servers via a network, adding a respective task of a plurality of tasks to each of the plurality of data feeds, queuing the plurality of tasks at a queuing database based on a priority and asynchronously processing the plurality of tasks by one or more worker servers. Each respective task of the plurality of tasks is a request for processing a data feed of the plurality of data feeds. In addition, one or more worker server fetches each of the plurality of tasks.

In an embodiment of the present invention, a push mechanism enables acquiring the plurality of data feeds from the one or more content servers. In another embodiment of the present invention, a pull mechanism enables acquiring the plurality of data feeds from the one or more content servers.

In an embodiment of the present invention, the method includes storing the plurality of tasks in a persistent queue. The queuing of the plurality of tasks is based on a priority. The priority is based on a predetermined criterion.

In an embodiment of the present invention, asynchronously processing of plurality of tasks by a worker server of the one or more worker servers includes requesting for additional tasks irrespective of status of the plurality of tasks running on other worker servers of the one or more worker servers.

In yet another aspect of the present invention, a system for processing a plurality of data feeds is provided. The system includes a feed processing platform. The feed processing algorithm includes a queuing data base and a plurality of worker servers. The feed processing algorithm is configured to communicate with a plurality of content servers to source a plurality of data feeds from the one or more content servers via a network, adding a respective task of a plurality of tasks to each of the plurality of data feeds, queuing the plurality of tasks at the queuing database, fetching each of the plurality of tasks queued at the queuing database by the one or more worker servers and asynchronously processing the plurality of tasks by the one or more worker servers. Each respective task of the plurality of tasks is a request for processing a data feed of the plurality of data feeds.

In an embodiment of the present invention, a push mechanism enables acquiring the plurality of data feeds from the one or more content servers. In another embodiment of the present invention, a pull mechanism enables acquiring the plurality of data feeds from the one or more content servers.

In addition, in an embodiment of the present invention, the feed processing platform is configured to storing the plurality of tasks in a persistent queue. Further, the priority is based on a predetermined criterion. Furthermore, asynchronously processing the plurality of tasks by a worker server of the one or more worker servers includes requesting for additional tasks irrespective of status of the plurality of tasks running on other worker servers of the one or more worker servers.

In an embodiment of the present invention, the feed processing platform is configured to disengage a first set of workers servers of the one or more worker servers when traffic load of the plurality of tasks is decreased. In another embodiment of the present invention, the feed processing platform is configured to engage a first set of workers servers in the one or more worker servers when traffic load of the plurality of tasks is increased.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

For a more complete understanding of example embodiments of the present technology, reference is now made to the following descriptions taken in connection with the accompanying drawings in which.

DETAILED DESCRIPTION OF THE INVENTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
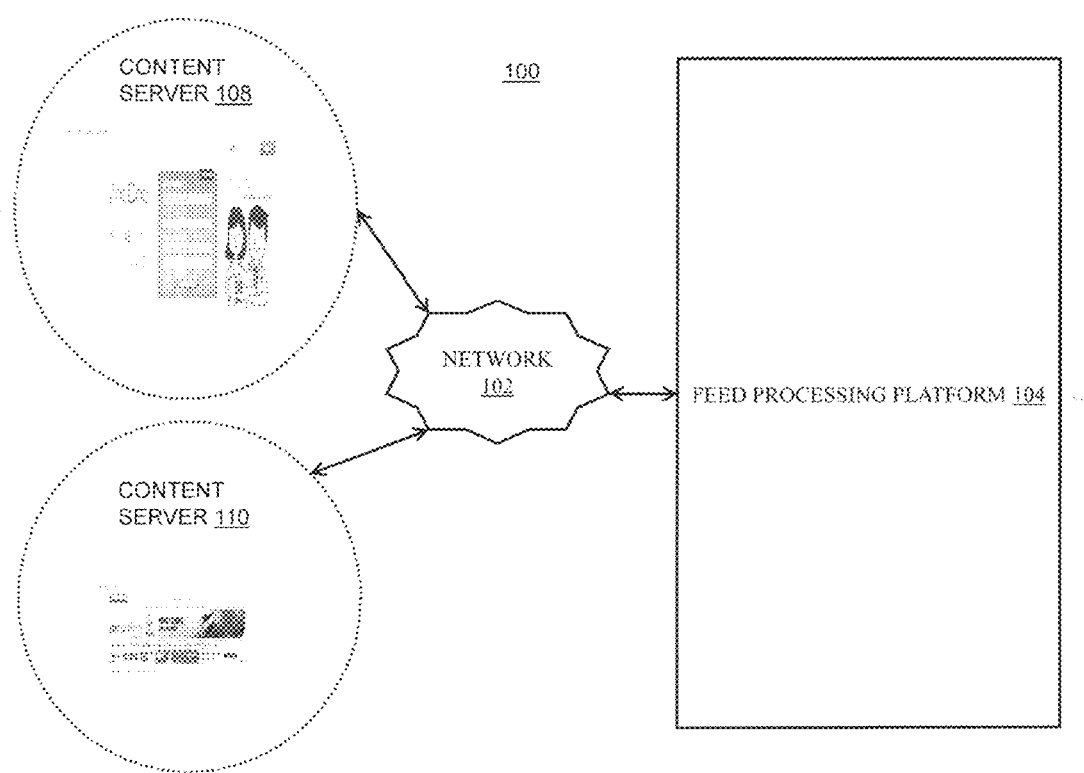
FIG. 1 illustrates a block diagram of a system for processing a plurality of data feeds, in accordance with various embodiments of the present invention.

FIG. 1 illustrates a system 100 for processing a plurality of data feeds, in accordance with various embodiments of the present invention. The system 100 includes a feed processing platform 104 and a plurality of content servers (say a content server 108 and a content server 110). The feed processing platform 104 processes the data feeds which emanates from the content server 108 and the content server 110.

In context of the present application, data feeds refer to a data format used for providing users with frequently updated content from a website. The data feeds of the updated content can include but may not be limited to news, weather, and stocks. The data feeds are sourced from the content server 108 and the content server 110. In addition, in context of the present invention, the content server 108 and the content server 110 refer to servers that host one or more websites including the content and having an association with the feed processing platform 104. For example, the content server 108 hosts the websites like www.hindu.com, www.nytimes.com, and the like. For example, a content server 106 associates with the feed processing platform 104 by registering with the feed processing platform 104. It may be noted that FIG. 1 illustrates the association of the content server 108 and the content server 110 with the feed processing platform 104; however, those skilled in the art would appreciate that the feed processing platform 104 can be associated with multiple content servers.

The feed processing platform 104 communicates with the content servers 106 via a network 102. The network 102 can be Internet, an intranet, and the like. In an embodiment, the feed processing platform 104 employs a push mechanism for sourcing the data feeds from the content server 108. In the push mechanism, the request for the content is initiated by the content server 108. Therefore, when new content is added to a website hosted by the content server 108, the feed processing platform 104 receives a notification from the content server 108. In context of the present application, the notification refers to a web request to the feed processing platform 104 for fetching the contents of a data feed. The notification can include a data feed identification, priority information, and the like. The push mechanism is employed using PubSubHubbub protocol and installable plugins or plugable Javascript® code to send a request for fetching the data feeds. The PubSubHubbub protocol provides near-instant notifications of change updates from the content server 108.

In another embodiment, the feed processing platform 104 employs a pull mechanism for sourcing the data feeds from the content servers 108. In the pull mechanism, the initial request for the data feeds originates from the feed processing platform 104, and is accordingly responded to by the content servers 108. In this embodiment, the feed processing platform 104 pings the content server 108 at regular intervals for any new content.

Figure 2:
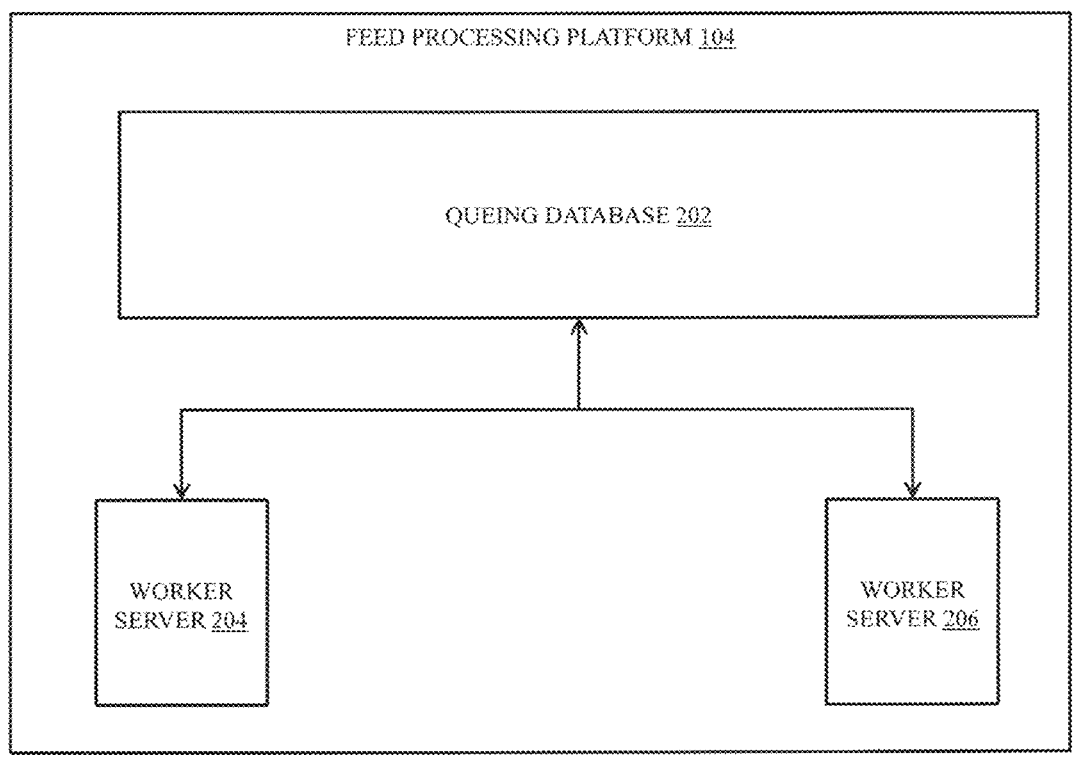
FIG. 2 illustrates a block diagram of a feed processing platform for processing a plurality of data feeds, in accordance with various embodiments of the present invention.

FIG. 2 illustrates a block diagram of the feed processing platform 104 for processing the plurality of data feeds, in accordance with various embodiments of the present invention. It may be noted that to explain the feed processing platform 104, reference will be made to the system elements of the FIG. 1.

The feed processing platform 104 include a queuing database 202 and a plurality of worker servers (say a worker server 204 and a worker server 206). As stated above, the feed processing platform 104 sources the data feeds. In an embodiment, when the feed processing platform 104 receives the notification in the push mechanism, the feed processing platform 104 adds a task to process the data feeds to the queuing database 202. The task refers to a request for processing a data feed. In another embodiment, on detecting new content in the pull mechanism, the feed processing platform 104 adds a task to process a data feed from the content server 108 to the queuing database 202.

The tasks for processing the data feeds are stored and queued centrally in a persistent queue in the queuing database 202. The term 'persistent queue' refers to a data queue that resides on the queuing database 202 that can be recovered in case of a system failure, an idle duration, etc. The persistent queue is created by taking a snapshot or backup of all the data stored in the queuing database 202. Therefore, in case of a system failure, the snapshots are referred to for recovering the data. Hence, the persistent queue ensures zero loss of the tasks. Examples of the queuing database 204 can be a persistent priority aware message broker based on Advanced Message Queuing Protocol (AMQP).

In an embodiment, the tasks are queued on a priority basis where the task with a higher priority is served before a task with a lower priority. In this embodiment, the queuing database 202 is priority aware of the enqueued tasks. The feed processing platform 104 sets the priorities based on a predetermined criterion. The predetermined criterion can be based on several factors which include but may not be limited to frequency with which the content servers 108 publish new web content and service-level agreement (SLA). The term 'service-level agreement' refers to a part of a service contract, where the publishers of the content servers 108 formally define the level of service expected from the feed processing platform 104. Therefore, if the SLA of the content server 108 specifies a high level of service, the feed processing platform 104 assigns a higher priority to the tasks from the particular content server 108.

The worker server 204 (and/or say the worker server 206) fetches the tasks from the queuing database 202. In an embodiment, the worker server 204 (and/or say the worker server 206) checks if there are any relevant tasks available in the queuing database 202. The tasks arrive at the worker servers 204 as Hypertext Transfer Protocol (HTTP) requests. Each of the worker servers (the worker server 204 and the worker server 206) pick up one or more tasks for processing from the queuing database 202.

The tasks are asynchronously processed in each of the worker servers (the worker server 204 and the worker server 206). Therefore, unlike in synchronous servers where a task cannot be requested until a previous task is processed, each of the worker servers 204 and 206 is configured to request for additional tasks irrespective of the status of the tasks running on other worker servers. The asynchronous nature of the worker servers 204 and 206 provides a linear increase in throughput with increase in hardware resources. Moreover, the tasks can be added to the queue perpetually without waiting for the completion of the other tasks already enqueued in the queuing database 202.

In an embodiment, one or more web servers are configured as worker servers 204 and 206. The web servers refer to servers that deliver web pages on request to clients using the Hypertext Transfer Protocol (HTTP). In this embodiment, the web servers are configured to process the data feeds that are sourced from the content server 108 and the content server 110. Due to the time proven effectiveness of the web servers in processing a large number of web requests, the web servers are chosen for processing the data feeds. The term 'web requests' refers to a request from a client such as a web browser for a web resource or a web page.

The worker servers 204 and 206 of disclosed herein are capable of handling a high concurrency of requests as compared to multithreading or processing inside a core stack which are vulnerable to segmentation faults, out of memory exceptions, database locking, and the like. The segmentation faults refer to bus errors that generally occur when a program attempts to access an area of memory that it is not allowed to access. In an embodiment, the worker servers 204 and 206 are further configured to handle broken HTML or bad schema of the data feeds, thereby providing robustness during processing of the data feeds.

The feed processing platform 104 is configured to be auto scalable and can be scaled up or scaled down depending on the traffic load of the tasks. In other words, when the traffic load of the tasks increases, additional worker servers are engaged by the feed processing platform 104 for processing the tasks. Similarly, when the traffic load of the tasks decreases, one or more worker servers (any of the worker server 204 and the worker server 206) can be disengaged by the feed processing platform 104, thereby enhancing efficiency of the feed processing platform 104. For example, when the burst rate of the tasks is 1000 requests/minute, the feed processing platform 104 may employ the worker server 204 and the worker server 206; and when the burst rate of the tasks is 10000 requests/minute, the feed processing platform 104 may employ twenty worker servers for processing the tasks.

Figure 3:
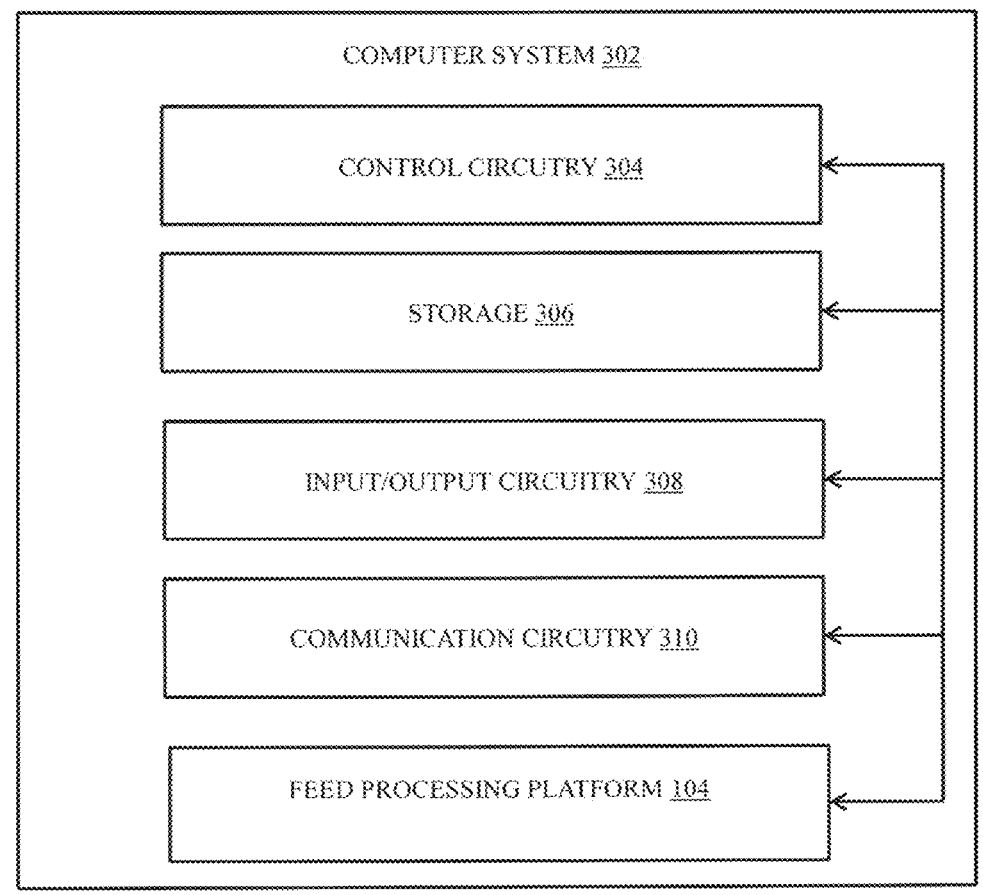
FIG. 3 illustrates a block diagram of a computer system, in accordance with various embodiments of the present invention.

FIG. 3 illustrates a block diagram 300 of a computer system 302 having the feed processing platform 104, in accordance with various embodiments of the present invention. The computer system 302 includes but may not be limited to a control circuitry 304, a storage 306, an input/output circuitry 308, and a communication circuitry 310. The control circuitry 304, the storage 306, the input/output circuitry 308, and the communication circuitry 310 works in conjunction with the feed processing platform 104 to process the data feeds.

From the perspective of this invention, the control circuitry 304 includes any processing circuitry or processor operative to control the operations and performance of the computer system 302. For example, the control circuitry 304 may be used to run operating system applications, firmware applications, media playback applications, media editing applications, or any other application. In an embodiment, the control circuitry 304 drives a display and process inputs received from a user interface.

From the perspective of this invention, the storage 306 includes one or more storage mediums including a harddrive, solid state drive, flash memory, permanent memory such as ROM, any other suitable type of storage component, or any combination thereof. The Storage 306 may store, for example, media data (e.g., music and video files), application data (e.g., for implementing functions on the computer system 302).

From the perspective of this invention, the I/O circuitry 308 may be operative to convert (and encode/decode, if necessary) analog signals and other signals into digital data. In an embodiment, the I/O circuitry 308 may also convert digital data into any other type of signal, and vice-versa. For example, the I/O circuitry 308 may receive and convert physical contact inputs (e.g., from a multi-touch screen), physical movements (e.g., from a mouse or sensor), analog audio signals (e.g., from a microphone), or any other input. The digital data may be provided to and received from the control circuitry 304, the storage 306, or any other component of the computer system 302.

It may be noted that the I/O circuitry 308 is illustrated in FIG. 3 as a single component of the computer system 302; however those skilled in the art would appreciate that several instances of the I/O circuitry 308 may be included in the computer system 302.

The computer system 302 may include any suitable interface or component for allowing a user to provide inputs to the I/O circuitry 308. The computer system 302 may include any suitable input mechanism. Examples of the input mechanism include but may not be limited to a button, keypad, dial, a click wheel, and a touch screen. In an embodiment, the computer system 302 may include a capacitive sensing mechanism, or a multi-touch capacitive sensing mechanism.

In an embodiment, the computer system 302 may include specialized output circuitry associated with output devices such as, for example, one or more audio outputs. The audio output may include one or more speakers built into the computer system 302, or an audio component that may be remotely coupled to the computer system 302.

The one or more speakers can be mono speakers, stereo speakers, or a combination of both. The audio component can be a headset, headphones or ear buds that may be coupled to communications device with a wire or wirelessly.

In an embodiment, the I/O circuitry 308 may include display circuitry for providing a display visible to the user. For example, the display circuitry may include a screen (e.g., an LCD screen) that is incorporated in the computer system 302.

The display circuitry may include a movable display or a projecting system for providing a display of content on a surface remote from the computer system 302 (e.g., a video projector). In an embodiment, the display circuitry may include a coder/decoder to convert digital media data into analog signals. For example, the display circuitry may include video Codecs, audio Codecs, or any other suitable type of Codec.

The display circuitry may include display driver circuitry, circuitry for driving display drivers, or both. The display circuitry may be operative to display content. The display content can include media playback information, application screens for applications implemented on the electronic device, information regarding ongoing communications operations, information regarding incoming communications requests, or device operation screens under the direction of the control circuitry 304. Alternatively, the display circuitry may be operative to provide instructions to a remote display.

From the prospective of this invention, the communications circuitry 310 may include any suitable communications circuitry operative to connect to a communications network and to transmit communications (e.g., voice or data) from the computer system 302 to other devices within the communications network. The communications circuitry 310 may be operative to interface with the communications network using any suitable communications protocol. Examples of the communications protocol include but may not be limited to Wi-Fi, Bluetooth®, radio frequency systems, infrared, LTE, GSM, GSM plus EDGE, CDMA, and quadband.

In an embodiment, the same instance of the communications circuitry 310 may be operative to provide for communications over several communications networks. In an embodiment, the computer system 302 may be coupled a host device for data transfers, synching the communications device, software or firmware updates, providing performance information to a remote source (e.g. providing riding characteristics to a remote server) or performing any other suitable operation that may require the computer system 302 to be coupled to a host device. Several computing devices may be coupled to a single host device using the host device as a server. Alternatively or additionally, the computer system 302 may be coupled to several host devices (e.g., for each of the plurality of the host devices to serve as a backup for data stored in the computer system 302).

Figure 4:
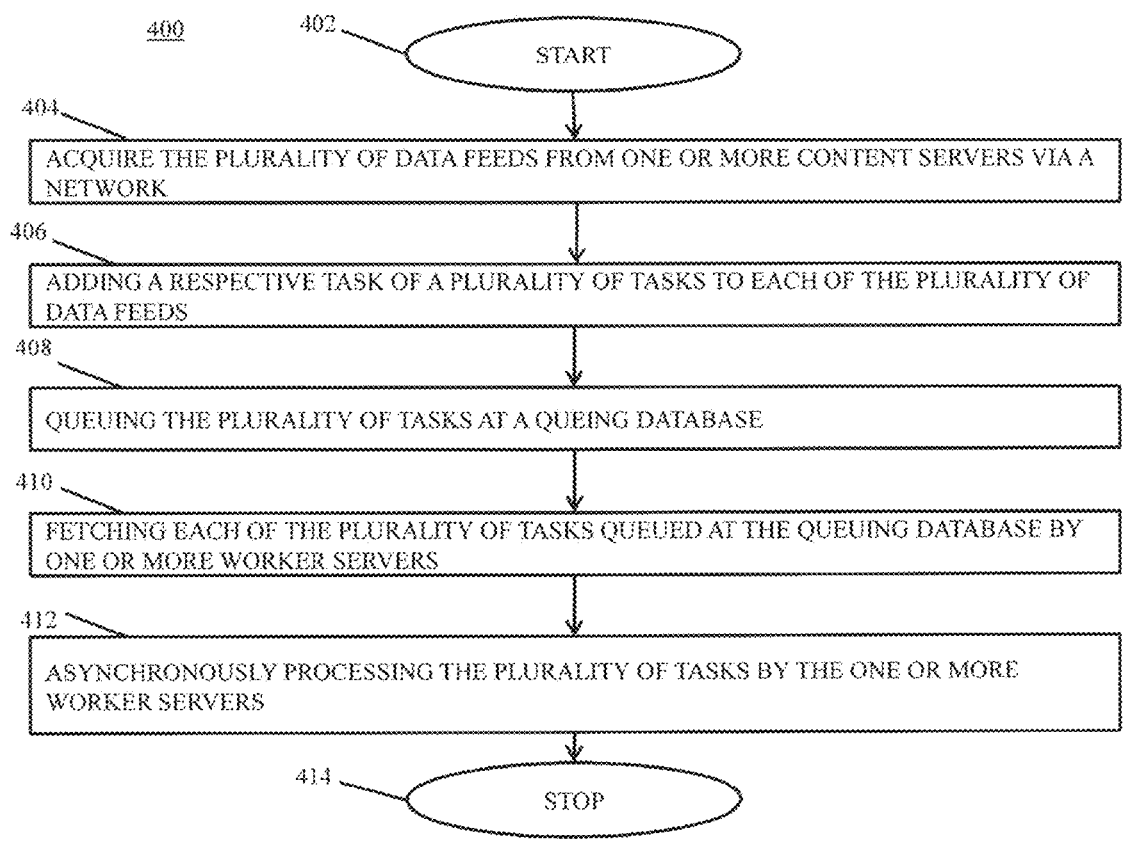
FIG. 4 illustrates a flow chart for processing a plurality of data feeds, in accordance with an embodiment of the present invention.

FIG. 4 illustrates a flow chart 400 for processing the plurality of data feeds, in accordance with an embodiment of the present invention. It may be noted that references will be made to FIG. 1, FIG. 2 and FIG. 3 to explain the flow chart 400. In addition, the flow chart 400 can have more or less number of steps which lies in the scope of the present invention.

At step 402, the flow chart 400 initiates. At step 404, the feed processing platform 104 acquires the plurality of data feeds from one or more content servers 106 and 108 via the network 102. At step 406, the feed processing platform 104 adds a respective task to each of the plurality of data feeds. Each respective task is a request for processing a data feed of said plurality of data feeds. At step 408, the plurality of tasks is queued at the queuing database 202. At step 410, the one or more worker servers 204 and 206 fetch each of the tasks. At step 412, the one or more worker servers 204 and 206 asynchronously process the tasks.

In an embodiment of the present invention, the push mechanism enables acquiring the plurality of data feeds from the one or more content servers 106 and 108. In another embodiment of the present invention, a pull mechanism enables acquiring the plurality of data feeds from the one or more content servers 106 and 108.

In an embodiment of the present invention, the method includes storing the plurality of tasks in a persistent queue. The queuing of the plurality of tasks is based on a priority. The priority is based on a predetermined criterion.

In an embodiment of the present invention, asynchronously processing of plurality of tasks by a worker server of the one or more worker servers 204 and 206 includes requesting for additional tasks irrespective of status of the plurality of tasks running on other worker servers of the one or more worker servers. At step 414, the flow chart 400 terminates.

Figure 5:
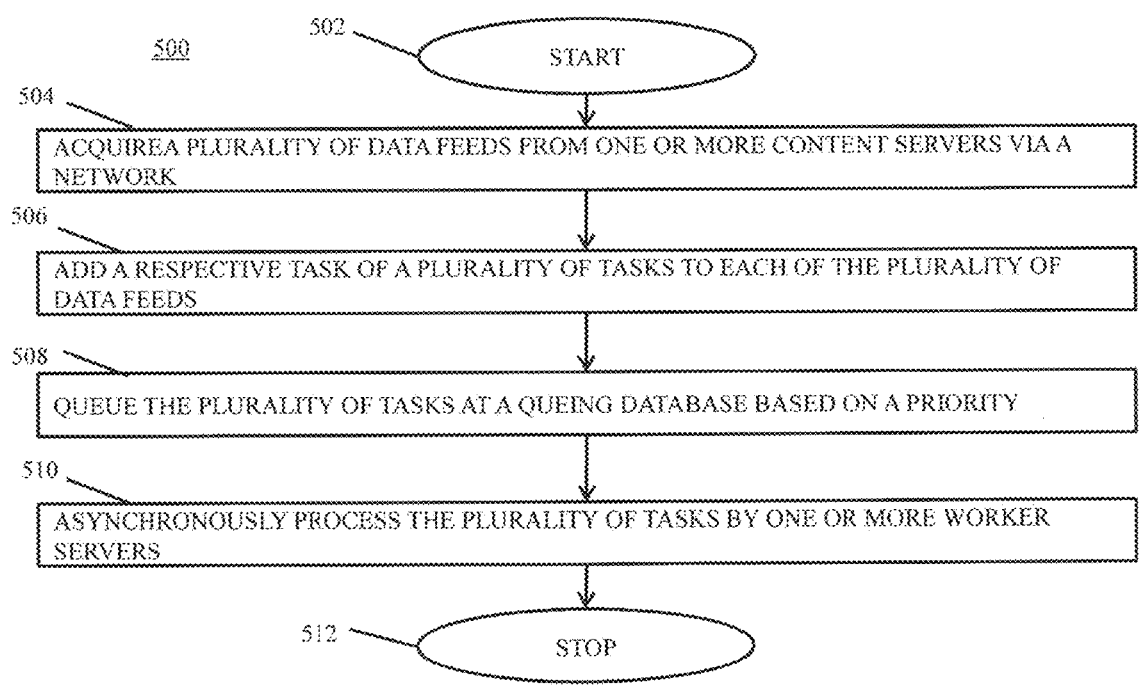
FIG. 5 illustrates a flow chart for processing a plurality of data feeds, in accordance with another embodiment of the present invention.

FIG. 5 illustrates a flow chart 500 for processing a plurality of data feeds, in accordance with another embodiment of the present invention. It may be noted that references will be made to FIG. 1, FIG. 2 and FIG. 3 to explain the flow chart 500. In addition, the flow chart 500 can have more or less number of steps which lies in the scope of the present invention.

At step 502, the flow chart 500 initiates. At step 504, the feed processing platform 104 acquires the plurality of data feeds from one or more content servers 106 and 108 via the network 102. At step 506, the feed processing platform 104 adds a respective task to each of the plurality of data feeds. Each respective task is a request for processing a data feed of said plurality of data feeds. At step 508, the plurality of tasks is queued at the queuing database 202 based on the priority. At step 510, the one or more worker servers 204 and 206 asynchronously process the tasks.

In an embodiment of the present invention, the push mechanism enables acquiring the plurality of data feeds from the one or more content servers 106 and 108. In another embodiment of the present invention, a pull mechanism enables acquiring the plurality of data feeds from the one or more content servers 106 and 108.

In an embodiment of the present invention, the method includes storing the plurality of tasks in a persistent queue. The queuing of the plurality of tasks is based on a priority. The priority is based on a predetermined criterion.

In an embodiment of the present invention, asynchronously processing of plurality of tasks by a worker server of the one or more worker servers 204 and 206 includes requesting for additional tasks irrespective of status of the plurality of tasks running on other worker servers of the one or more worker servers. At step 512, the flow chart 500 terminates.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for processing a plurality of data feeds, the method comprising:
    acquiring said plurality of data feeds from one or more content servers via a network;
    adding a respective task of a plurality of tasks to each of said plurality of data feeds, wherein each respective task of said plurality of tasks is a request for processing a data feed of said plurality of data feeds;
    storing and queuing said plurality of tasks in a persistent queue at a queuing database;
    fetching each of said plurality of tasks queued at said queuing database by one or more worker servers;
    asynchronously processing said plurality of tasks by said one or more worker servers; and
    engaging additional worker servers when traffic load of the tasks increases, and disengaging one or more of the worker servers when the traffic load of the tasks decreases, to maintain a ratio of traffic load of the tasks to number of engaged worker servers;
    wherein a push mechanism enables acquiring said plurality of data feeds from said one or more content servers;
    wherein a pull mechanism enables acquiring said plurality of data feeds from said one or more content servers;
    wherein the persistent queue is created by taking a snapshot of data stored in the queuing database for recovery in event of the queuing database being inaccessible.

2. The method as recited in claim 1, wherein queuing said plurality of tasks is based on a priority.

3. The method as recited in claim 2, wherein said priority is based on a predetermined criterion, the predetermined criteria including at least one of a frequency with which the content servers publish new web content and a service-level agreement relating to the content servers and the feed processing platform.

4. The method as recited in claim 1, wherein asynchronously processing said plurality of tasks by a worker server of said one or more worker servers comprises requesting for additional tasks irrespective of status of said plurality of tasks running on other worker servers of said one or more worker servers.

5. A method for processing a plurality of data feeds, the method comprising:
    acquiring said plurality of data feeds from one or more content servers via a network;
    adding a respective task of a plurality of tasks to each of said plurality of data feeds, wherein each respective task of said plurality of tasks is a request for processing a data feed of said plurality of data feeds;
    storing and queuing said plurality of tasks in a persistent queue at a queuing database based on a priority;
    asynchronously processing said plurality of tasks by one or more worker servers, wherein said one or more worker server fetches each of said plurality of tasks; and
    engaging additional worker servers when traffic load of the tasks increases, and disengaging one or more of the worker servers when the traffic load of the tasks decreases, to maintain a ratio of traffic load of the tasks to number of engaged worker servers
    wherein a push mechanism enables acquiring said plurality of data feeds from said one or more content servers;
    wherein a pull mechanism enables acquiring said plurality of data feeds from said one or more content servers.

6. The method as recited in claim 5, wherein said priority is based on a predetermined criterion.

7. The method as recited in claim 5, wherein asynchronously processing said plurality of tasks by a worker server of said one or more worker servers comprises requesting for additional tasks irrespective of status of tasks running on other worker servers of said one or more worker servers.

8. A system for processing a plurality of data feeds, the system comprising:
a feed processing platform, wherein said feed processing platform comprises:
a queuing data base; and
a plurality of worker servers,
wherein said feed processing platform is configured to:
communicate with a plurality of content servers to source a plurality of data feeds from said one or more content servers via a network;
add a respective task of a plurality of tasks to each of said plurality of data feeds, wherein each respective task of said plurality of tasks is a request for processing a data feed of said plurality of data feeds;
queue said plurality of tasks at said queuing database;
fetch each of said plurality of tasks queued at said queuing database by said one or more worker servers;
asynchronously process said plurality of tasks by said one or more worker servers; and
engage additional worker servers when traffic load of the tasks increases, and disengaging one or more of the worker servers when the traffic load of the tasks decreases, to maintain a ratio of traffic load of the tasks to number of engaged worker servers;
wherein a push mechanism enables sourcing said plurality of data feeds from said one or more content servers;
wherein a pull mechanism enables sourcing said plurality of data feeds from said one or more content servers;
wherein queuing said plurality of tasks is based on a priority based on a predetermined criterion.

9. The system as recited in claim 8, wherein asynchronously processing said plurality of tasks by a worker server of said one or more worker servers comprises requesting for additional tasks irrespective of status of said plurality of tasks running on other worker servers of said one or more worker servers.

10. The system as recited in claim 8, wherein said feed processing platform is configured to disengage a first set of workers servers of said one or more worker servers when traffic load of said plurality of tasks is decreased.

11. The system as recited in claim 8, wherein said feed processing platform is configured to engage a first set of workers servers in said one or more worker servers when traffic load of said plurality of tasks is increased.

* * * * *